Patented May 13, 1941

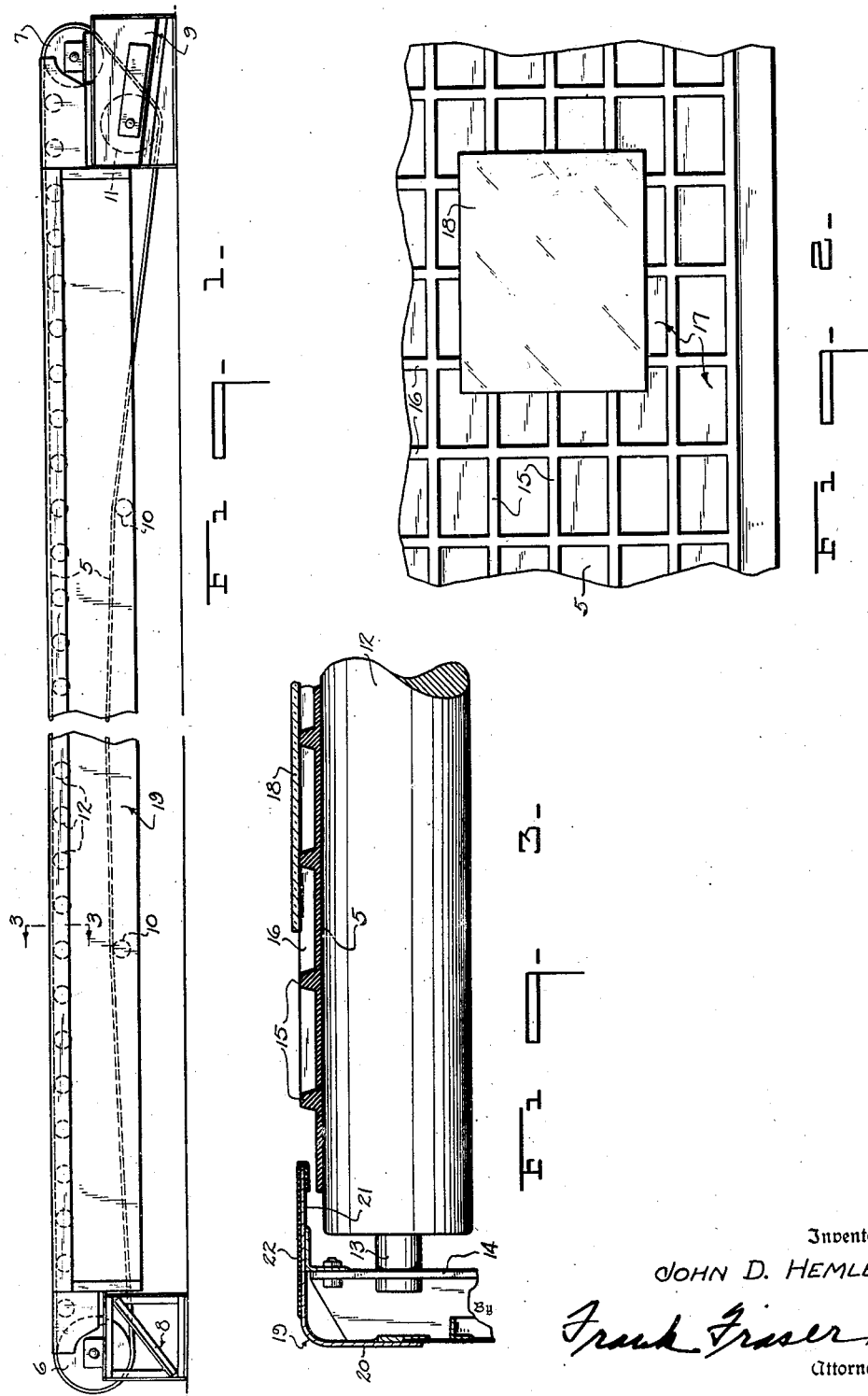

2,241,640

UNITED STATES PATENT OFFICE 2,241,640

CONVEYER

John D. Hemley, Ottawa, Ill., assignor to Libbey-Owens-Ford Glass Company, Toledo, Ohio, a corporation of Ohio Application December 8, 1938, Serial No. 244,524

3 Claims. (Cl. 198—193)

The present invention relates to conveyers in general and more especially to an endless type conveyer of novel and improved construction particularly adapted for conveying flat sheets or plates.

Although it is to be expressly understood that the conveyer herein provided is not restricted to any specific use, or to the conveying of sheets or plates of any special material, it has been primarily designed for and is of utility in the conveying of glass sheets or plates during the assembling thereof with interposed layers of plastic material during the manufacture of laminated safety glass.

It is an aim of this invention to provide an endless conveyer so constructed as to facilitate the picking up of the glass sheets or plates from the conveyer by the operator, whereby to expedite the assembling of the glass sheets or plates with an interposed layer of plastic material as the said sheets or plates are being carried forwardly upon said conveyer.

Another object of the invention is the provision of such a conveyer consisting of an endless belt provided upon one surface thereof with a series of longitudinally and transversely extending ribs for supporting the glass sheets or plates in spaced relation to the belt in such a manner as to provide so-called "finger-holds" beneath the edges of the said sheets or plates to assure a more convenient and positive gripping and lifting thereof from the conveyer by the operator.

Other objects and advantages of the invention will become more apparent during the course of the following description, when taken in connection with the accompanying drawing.

In the drawing, wherein like numerals are employed to designate like parts throughout the same:

Fig. 1 is a side elevation of an endless conveyer constructed in accordance with the invention;

Fig. 2 is a plan view of a portion of the conveyer; and

Fig. 3 is a vertical transverse section through the conveyer taken substantially on line 3—3 of Fig. 1.

With reference now to the drawing, the improved conveyer herein provided consists of an endless, preferably imperforate, belt 5 of any suitable length and width. The endless belt is trained at the opposite ends of its loop about the rollers or drums 6 and 7 which are rotatably mounted upon suitable stationary supports 8 and 9 respectively. The lower horizontal flight of the belt may be passed over a plurality of small rolls 10 which cooperate with the roller or drum 11, carried by the support 9, to maintain the belt taut.

The upper horizontal flight of the belt is guided in its travel and also prevented from sagging by means of a plurality of horizontally aligned, transverse idler rolls 12. These rolls are mounted upon shafts or trunnions 13 suitably journaled at each end in a stationary supporting frame 14.

The endless belt 5 is preferably of rubber or some other suitable flexible material and is provided upon its outer surface with a series of spaced longitudinally and transversely extending ribs 15 and 16 respectively. These ribs intersect one another, as clearly shown in Fig. 2, to provide a plurality of relatively shallow rectangular recesses 17 therebetween. The ribs 15 and 16 are preferably of the same material as the belt 5 and are formed integral therewith.

The sheets or plates of glass or the like 18 are adapted to be carried forwardly upon the upper flight of the endless conveyer and are supported horizontally upon the ribs 15 and 16 in spaced relation to the belt 5. When the sheets are laid horizontally upon the conveyer, certain of the edges thereof will project beyond certain of the longitudinal and transverse ribs 15 and 16 to provide spaces therebeneath which constitute so-called "finger-holds" for the operator. In other words, the spaces beneath the edges of the sheets allows the operator to more readily slip his fingers beneath the sheets which, in turn, permits the gripping and lifting of the sheets from the conveyer more convenient and positive. The operator can not only pick up the sheets more quickly but, in addition, a firmer grip can be obtained thereon, thereby minimizing the danger of dropping the sheets and the liability of breaking or scratching the same.

As brought out above, one of the important uses of the conveyer herein provided is in the conveying of glass sheets or plates during the assembling thereof with an interposed layer of plastic material in the manufacture of laminated safety glass. Laminated safety glass ordinarily comprises two sheets or plates of glass and an interposed layer of plastic material bonded together to form a composite structure. During the production of laminated safety glass, the glass sheets or plates are first thoroughly cleaned after which one surface of each sheet or plate may be coated, if desired, with a suitable adhesive. The coated sheets or plates can then be passed onto the endless conveyer and as they are carried along thereupon, a layer of plastic material is laid upon one sheet of glass and a second sheet of glass then picked up from the conveyer, turned over, and laid upon the plastic to form a "sandwich." This "sandwich" is then removed from the conveyer and passed on to the next operation, which ordinarily consists in the bonding of the laminations together.

Since the glass sheets and layer of plastic are assembled as the sheets are being carried forwardly upon the conveyer, it is necessary that the sheets not only be handled quite rapidly but also that they be accurately assembled. The convenient and positive handling of the sheets is greatly aided by the provision of the longitudinal and transverse ribs 15 and 16 which hold the sheets in spaced relation to the endless belt so that they can be more easily and quickly picked up by the operator. This not only facilitates the rapid and accurate assembling of the glass sheets with the plastic but also the removal of the assembled "sandwich" from the conveyer with minimum danger of slippage of the sheets relative to one another.

Arranged at each side of the endless conveyer is a guard 19 including a substantially vertical apron 20 and a substantially horizontal shelf 21 which overlaps the adjacent ends of the rolls 12 and the adjacent edge of the endless belt 5. The horizontal shelf 21 of the guard 19 is preferably covered with rubber or the like 22. The guard 19 is provided to protect the operator from contact with the rolls 12 while the rubber covering for the shelf 21 reduces the liability of chipping or breaking of the glass sheets should they strike the shelf during the placing of them upon or removing them from the conveyer.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A conveyer for conveying glass sheets or plates during the assembling thereof with an interposed layer of plastic material in the manufacture of laminated safety glass, comprising an endless belt of flexible material, and a series of longitudinally and transversely extending ribs carried thereby for supporting the sheets or plates in spaced relation to the body of the belt when said sheets or plates are laid horizontally thereupon and also cooperating with one another to steady the glass sheets or plates and prevent tipping or tilting thereof during the assembling operation.

2. A conveyer for conveying glass sheets or plates during the assembling thereof with an interposed layer of plastic material in the manufacture of laminated safety glass, comprising an endless belt of flexible material having formed upon one surface thereof a plurality of spaced ribs extending in different directions and intersecting one another to provide relatively shallow recesses therebetween, the sheets or plates being supported horizontally upon said ribs in spaced relation to the body of the belt, said ribs cooperating with one another to steady the glass sheets or plates and prevent tipping or tilting thereof during the assembling operation.

3. A conveyer for conveying glass sheets or plates during the assembling thereof with an interposed layer of plastic material in the manufacture of laminated safety glass, comprising an endless belt of flexible material having formed upon one surface thereof a series of longitudinally and transversely extending ribs intersecting one another to provide relatively shallow substantially rectangular recesses therebetween, the sheets or plates being supported horizontally upon said ribs in spaced relation to the body of the belt, said longitudinally and transversely extending ribs cooperating with one another to steady the glass sheets or plates and prevent tipping or tilting thereof during the assembling operation.

JOHN D. HEMLEY.